United States Patent Office 3,709,960
Patented Jan. 9, 1973

3,709,960
O-LOWERALKYL-O - [2 - ALKOXYLCARBONYL-METHYL]VINYL-MONOALKYLAMIDO PHOSPHATES
Karl Lutz, Basel, and Max Schuler, Basel-land, Switzerland, assignors to Sandoz Ltd. (also known as Sandoz AG), Basel, Switzerland
No Drawing. Continuation-in-part of application Ser. No. 706,654, Feb. 19, 1968. This application Nov. 12, 1969, Ser. No. 876,105
Claims priority, application Switzerland, Feb. 22, 1967, 2,599/67
Int. Cl. C07f 9/24; A01n 9/36
U.S. Cl. 260—941                                    11 Claims

ABSTRACT OF THE DISCLOSURE

Novel insecticidally active phosphoric acid amide esters of the Formula I $$\begin{array}{c} R_1-O \\ \phantom{R_1-}\searrow\uparrow \\ \phantom{R_1-O\searrow}P-O-C=CH-COOR_3 \\ \phantom{R_1-}\nearrow \phantom{P-O-}| \\ R_2-NH \phantom{P-O-}CH_3 \end{array} \quad I$$

in which each of $R_1$, $R_2$ and $R_3$ represents an alkyl radical with from 1 to 5 carbon atoms inclusive, are produced by reacting a compound of the Formula IV $$\begin{array}{c} O \phantom{-}Cl \\ \phantom{R_1-O-}\uparrow\nearrow \\ R_1-O-P \\ \phantom{R_1-O-P}\searrow \\ \phantom{R_1-O-P-}Cl \end{array} \quad IV$$

with an alkylamine in the presence of an acid acceptor, and then reacting the resulting reaction product with the enol form of an acetic acid alkyl ester of the Formula III $$\begin{array}{c} M-O-C=CH-COOR_3 \\ \phantom{M-O-}| \\ \phantom{M-O-}CH_3 \end{array} \quad III$$

in which M is a salt forming atom or radical. Preparations containing varying amounts of the compounds of Formula I and one or more diluents (e.g. isooctylphenyloctaglycol ether and/or a high boiling petroleum fraction and/or xylene, diisohexyl/heptylphenylhexaglycol ether and acetone, and laurylhexaglycol ether and so-propyl alcohol) are used to show the pesticidal effect of the said active agents by means of contact tests on *Bruchidius obtectus* and *Ephestia* (*Anagesta*) *Kuehniella*, feed effect on *Carausius morosus* and acaricidal contact effect on *Tetranychus telarius*. Some comparative tests are also given to demonstrate superiority over known compounds having pesticidal activity, including lesser toxicity towards warm-blooded animals.

BACKGROUND OF INVENTION

This application is a continuation in part of application Ser. No. 706,654 filed Feb. 19, 1968, now abandoned.

Although phosphoric acid derivatives having an insecticidal effect have been known for some time, they mostly have disadvantages, e.g. their insecticidal effectiveness towards certain insects is insufficiently low, and/or their effect spectrum is too narrow, and/or their toxixity towards warm-blooded animals is dangerously high.

It is a purpose of the present invention to minimize or overcome the disadvantages of the previously described phosphoric acid derivatives having insecticidal properties. It has now been found that certain novel phosphoric acid amide esters, more specifically described hereinafter, have a surprisingly good insecticidal activity and/or wide effect spectrum and yet have a relatively low toxicity towards warm-blooded animals.

SUMMARY OF THE INVENTION

The present invention provides phosphoric acid amide esters of the Formula I $$\begin{array}{c} R_1-O \\ \phantom{R_1-}\searrow\uparrow \\ \phantom{R_1-O\searrow}P-O-C=CH-COOR_3 \\ \phantom{R_1-}\nearrow \phantom{P-O-}| \\ R_2-NH \phantom{P-O-}CH_3 \end{array} \quad I$$

in which each of $R_1$, $R_2$ and $R_3$ represents an alkyl radical of from 1 to 5 carbon atoms inclusive.

The compounds of Formula I may be obtained by a process which comprises reacting one mol of a compound of the Formula II $$\begin{array}{c} R_1-O \\ \phantom{R_1-}\searrow\uparrow \\ \phantom{R_1-O\searrow}P-Cl \\ \phantom{R_1-}\nearrow \\ R_2-NH \end{array} \quad II$$

in which $R_1$ and $R_2$ have the above significance, with 1 mol of the enol form of an acetic acid alkyl ester of the Formula III $$\begin{array}{c} M-O-C=CH-COOR_3 \\ \phantom{M-O-}| \\ \phantom{M-O-}CH_3 \end{array} \quad III$$

in which M represents an atom or radical capable of forming a salt, and $R_3$ has the above significance.

In producing the compounds of the Formula I it is preferred to proceed in such a way that a compound of the Formula II is reacted with an alkali metal salt of the compound of Formula III. Furthermore, the reaction is preferably effected in the presence of an inert solvent or suspension medium and at a temperature of from —10° C. up to the boiling point of the solvent or suspension medium, for example at 0° to 100° C., preferably at room temperature.

Examples of inert solvent or suspension media, which under the reaction conditions do not react with any of the reaction partners, are low molecular weight ketones and esters and preferably ethers (for example diethyl ether, di-n-propyl ether, di-isopropyl ether, furan, tetrahydrofuran, dioxan, ethylene glycol-dimethyl ether and -diethyl ether, anisol etc., as well as optionally halogenated hydrocarbons, for example n-pentane, n-hexane, n-heptane and mixtures thereof, petroleum ether, benzene, toluene, xylene, cyclohexane, trichloroethylene, chlorobenzene etc.

The compounds of Formula II used as starting materials for producing the compounds of the present invention may be obtained, for example, by reacting a compound of the Formula IV $$\begin{array}{c} O \phantom{-}Cl \\ \phantom{R_1-O-}\uparrow\nearrow \\ R_1-O-P \\ \phantom{R_1-O-P}\searrow \\ \phantom{R_1-O-P-}Cl \end{array} \quad IV$$

in which $R_1$ has the above significance, with an amine of the formula $R_2$—$NH_2$, in which $R_2$ has the above significance, in the presence of an acid acceptor. Examples of suitable acid acceptors are tertiary amines, for example trimethylamine, triethylamine, pyridine, N,N-dimethyl- or N,N-diethyl-aniline, a second mol of the amine $R_2$—$NH_2$ or anhydrous organic acid binding agents, e.g. sodium or potassium carbonate.

The reaction of the compound of Formula IV with the compound $R_2NH_2$, in which $R_2$ has the above significance, may be effected by mixing these compounds in the presence of an acid acceptor at a suitable temperature, it being advantageous for an inert solvent of the above defined nature to be present. Suitably working is effected at temperatures below room temperature, for temperature, for example at −30° to +15° C., preferably at −10° to +10° C.

For the reaction of the compound of the Formula II with the compound of the Formula III it is not necessary to isolate the first mentioned compound, providing it has been produced by the process mentioned above; on the contrary, it is quite suitable to use as the starting material a reaction mixture resulting by reacting 1 mol of a compound of the Formula IV and 1 mol of the amine $R_2$—$NH_2$, in which $R_2$ has the above significance, in the presence of an acid acceptor.

The compounds of the Formula I may be isolated from their solutions or suspensions in manner known per se. However, it is to be noted that after the reaction has taken place, the cation M has become attached to a chlorine atom and the resulting chloride, for example sodium, potassium or ammonium chloride or trimethylamine hydrochloride, is insoluble in many solvents and must therefore be first separated, for example by filtering or extraction with water. Only after this separation is it possible to isolate the end product, preferably by drying and evaporating the solvent.

The phosphoric acid amide esters of the Formula I are obtained in the form of liquids constituted by light coloured oils which may be purified by distillation in a high vacuum. They are soluble in oils and organic solvents and may be converted easily to aqueous emulsions. The compounds of Formula I are useful as pesticides, especially for combating insects and spider mites, in plant protection.

The combating of pests by means of the phosphoric acid amide esters of the Formula I may be suitably carried out in such a way that they are mixed with emulsifiers, for example with liquid polyglycol ethers obtained by the addition of ethylene oxide to high molecular weight alcohols, mercaptans or alkyl phenols, emulsification in water is then effected and the emulsion is applied to the surface to be treated by spraying. It is further possible to add to these mixtures suitable organic solvents as solubilizers, for example mono- or polyalcohols, ketones, aromatic hydrocarbons, mineral oils etc. Furthermore, in order to obtain products capable of being suspended in water it is possible to incorporate solid carriers, e.g. talc, kaolin, diatomaceous earth, bentonite etc. The liquid or pulverulent products are emulsified or dispersed in water before use, it being suitable for the resulting dispersions to contain 0.001 to 0.2% of the compound of Formula I; the upper limit of this range may be increased up to 15% when using them in the low volume spraying process (compare Hubert Martin, Insecticide and Fungicide Handbook, Blackwell Scientific Publications, Oxford 1963, p. 56).

It is likewise possible to work up the compounds of the Formula I to dusting or strewing agents or granulates without the addition of any emulsifiers, but with the addition, optionally in the presence of adhesives, or inert carriers, for example talc, kaolin, diatomaceous earth, bentonite, pumice, etc. or a mixture of such carriers.

The pesticidal, e.g. insecticidal, compositions can be applied as a spray or dust to the locus to be protected from the pests (insects), e.g. to growing crops, trees or bushes. Such application can be made directly to the locus during the period of insect infestation or alternatively the application can be made in advance of an anticipated insect infestation to prevent such infestation. For example the compositions can be applied as foliar sprays or dusts, but can also be applied as sprays or dusts directed to the surface of the soil.

The following examples illustrate the invention; the percentage yields are based on the theoretical yield and the temperatures are stated in degrees centigrade.

Example A: Production of intermediate compounds of the Formula II 1 mol of triethylamine and 1 mol of the amine of formula $R_2$—$NH_2$ (in which $R_2$ has the above significance) in ethyl ether or chloroform are added to 1 mol of the compound of the Formula IV, likewise dissolved in ethyl ether or chloroform, the addition being effected at −5 to 0°. After the reaction is complete, the resulting solution is briefly washed with ice water, then dried and the solvent distilled off in a vacuum. Since most of the intermediate products cannot be distilled, the evaporation residue is used without further purification for reaction with the compound of Formula III in the enol form, since the evaporation residue contains the compound of Formula II in sufficiently pure form.

In the following Table A there are set forth the analyses data and yields of some of the intermediate compounds of Formula II produced according to the above mentioned method.

TABLE A

| Example No. | $R_1$ | $R_2$ | Percent Cl Calc'd | Percent Cl Found | Percent yield |
|---|---|---|---|---|---|
| A.1 | $CH_3$ | $CH_3$ | 24.7 | 25.0 | 60 |
| A.2 | $CH_3$ | $C_2H_5$ | 22.6 | 23.0 | 64 |
| A.3 | $CH_3$ | n-$C_3H_7$ | 20.7 | 20.5 | 68 |
| A.4 | $CH_3$ | iso-$C_3H_7$ | 20.7 | 21.1 | 65 |
| A.5 | $CH_3$ | n-$C_4H_9$ | 19.2 | 19.6 | 70 |
| A.6 | $CH_3$ | iso-$C_4H_9$ | 19.2 | 19.0 | 65 |
| A.7 | $CH_3$ | sec.-$C_4H_9$ | 19.2 | 19.5 | 69 |
| A.8 | $C_2H_5$ | $CH_3$ | 22.6 | 22.8 | 63 |
| A.9 | $C_2H_5$ | $C_2H_5$ | 20.7 | 20.9 | 75 |
| A.10 | $C_2H_5$ | n-$C_3H_7$ | 19.2 | 19.4 | 80 |
| A.11 | $C_2H_5$ | iso-$C_3H_7$ | 19.2 | 19.7 | 78 |
| A.12 | $C_2H_5$ | n-$C_4H_9$ | 17.8 | 18.2 | 85 |
| A.13 | $C_2H_5$ | iso-$C_4H_9$ | 17.8 | 17.5 | 80 |
| A.14 | $C_2H_5$ | sec-$C_4H_9$ | 17.8 | 18.1 | 82 |
| A.15 | n-$C_3H_7$ | $CH_3$ | 20.7 | 20.9 | 62 |
| A.16 | n-$C_3H_7$ | $C_2H_5$ | 19.2 | 19.6 | 60 |
| A.17 | n-$C_3H_7$ | n-$C_3H_7$ | 17.8 | 18.1 | 69 |
| A.18 | n-$C_3H_7$ | iso-$C_3H_7$ | 17.8 | 17.5 | 78 |
| A.19 | iso-$C_3H_7$ | $CH_3$ | 20.7 | 21.0 | 93 |
| A.20 | iso-$C_3H_7$ | $C_2H_5$ | 19.2 | 19.5 | 92 |
| A.21 | iso-$C_3H_7$ | n-$C_3H_7$ | 17.8 | 18.0 | 80 |
| A.22 | iso-$C_3H_7$ | iso-$C_3H_7$ | 17.8 | 18.1 | 93 |

Example B: Reaction of the intermediate products of Formula II with the compounds of Formula III in the enol form:

1 gram atom of sodium metal is pulverized in anhydrous toluene and then 1 mol of the compound of Formula III in the enol form is added dropwise at 40–60° After the reaction has gone to completion, cooling to 0° is effected and 1 mol of the compound of Formula II is added dropwise during 10–20 minutes, during which period care is taken that, by suitable cooling, the temperature does not exceed 20–30°. Stirring at 30–50° is subsequently effected for a further 15–30 minutes. After cooling to 10–20°, extraction with a little water is effected, the separated toluene solution is dried over sodium sulphate and the solvent is distilled off on a water bath in the vacuum of a water pump. The crude phosphoric acid amide ester of the Formula I, which is obtained in a yield of 70–95%, can be further purified by distillation in a high vacuum.

In the following Table B there are shown the boiling points and analyses figures of some of the phosphoric acid amide esters of the Formula I produced according to the above method.

TABLE B

| Example No. | $R_1$ | $R_2$ | $R_3$ | B.P. °/$10^{-1}$ to $10^{-4}$ mm. Hg | Analyses, percent Calc'd (Found) C | P |
|---|---|---|---|---|---|---|
| B.1 | $CH_3$ | $CH_3$ | $CH_3$ | 114–116 | 37.6(38.1) | 13.9(13.5) |
| B.2 | $CH_3$ | $C_2H_5$ | $CH_3$ | 112–114 | 40.5(40.4) | 13.1(12.8) |
| B.3 | $CH_3$ | $n-C_3H_7$ | $CH_3$ | 116–119 | 43.1(43.1) | 12.4(12.2) |
| B.4 | $CH_3$ | $iso-C_3H_7$ | $CH_3$ | 105–107 | 43.1(43.3) | 12.4(12.7) |
| B.5 | $C_2H_5$ | $CH_3$ | $CH_3$ | 115–118 | 40.5(40.6) | 13.1(12.8) |
| B.6 | $C_2H_5$ | $C_2H_5$ | $CH_3$ | 114–116 | 43.1(43.0) | 12.4(12.3) |
| B.7 | $C_2H_5$ | $n-C_3H_7$ | $CH_3$ | 114–118 | 45.3(45.6) | 11.7(11.4) |
| B.8 | $C_2H_5$ | $iso-C_3H_7$ | $CH_3$ | 114–116 | 45.3(45.0) | 11.7(11.8) |
| B.9 | $CH_3$ | $CH_3$ | $C_2H_5$ | 107–109 | 40.5(40.8) | 13.1(13.3) |
| B.10 | $CH_3$ | $C_2H_5$ | $C_2H_5$ | 102–104 | 43.0(43.3) | 12.4(12.1) |
| B.11 | $CH_3$ | $n-C_3H_7$ | $C_2H_5$ | 114–116 | 45.3(44.9) | 11.7(11.5) |
| B.12 | $CH_3$ | $iso-C_3H_7$ | $C_2H_5$ | 111–112 | 45.3(45.3) | 11.7(11.9) |
| B.13 | $CH_3$ | $n-C_4H_9$ | $C_2H_5$ | 117 | 47.3(46.4) | 11.1(10.7) |
| B.14 | $CH_3$ | $iso-C_4H_9$ | $C_2H_5$ | 118 | 47.3(46.9) | 11.1(11.0) |
| B.15 | $CH_3$ | $sec.-C_4H_9$ | $C_2H_5$ | 110 | 47.3(47.1) | 11.1(11.2) |
| B.16 | $C_2H_5$ | $CH_3$ | $C_2H_5$ | 100–101 | 43.0(42.8) | 12.4(12.2) |
| B.17 | $C_2H_5$ | $C_2H_5$ | $C_2H_5$ | [1] 102 | 45.3(44.9) | 11.7(11.4) |
| B.18 | $C_2H_5$ | $n-C_3H_7$ | $C_2H_5$ | 108 | 47.3(47.5) | 11.1(11.2) |
| B.19 | $C_2H_5$ | $iso-C_3H_7$ | $C_2H_5$ | 103 | 47.3(47.6) | 11.1(10.9) |
| B.20 | $C_2H_5$ | $n-C_4H_9$ | $C_2H_5$ | 112 | 49.2(49.3) | 10.6(10.5) |
| B.21 | $C_2H_5$ | $iso-C_4H_9$ | $C_2H_5$ | 114 | 49.2(49.2) | 10.6(10.3) |
| B.22 | $C_2H_5$ | $sec.-C_4H_9$ | $C_2H_5$ | 114 | 49.2(49.0) | 10.6(10.8) |
| B.23 | $CH_3$ | $C_2H_5$ | $n-C_3H_7$ | 103 | 45–3(45.4) | 11.7(11.5) |
| B.24 | $CH_3$ | $n-C_3H_7$ | $n-C_3H_7$ | 111 | 47.3(47.2) | 11.1(10.8) |
| B.25 | $C_2H_5$ | $CH_3$ | $n-C_3H_7$ | 108 | 45.3(45.2) | 11.7(11.5) |
| B.26 | $C_2H_5$ | $C_2H_5$ | $n-C_3H_7$ | 106 | 47.3(47.4) | 11.1(11.0) |
| B.27 | $CH_3$ | $CH_3$ | $iso-C_3H_7$ | 100–102 | 43.1(43.2) | 12.4(12.2) |
| B.28 | $CH_3$ | $C_2H_5$ | $iso-C_3H_7$ | 115–117 | 45.3(45.5) | 11.7(11.4) |
| B.29 | $CH_3$ | $n-C_3H_7$ | $iso-C_3H_7$ | 116–118 | 47.3(47.1) | 11.1(11.0) |
| B.30 | $CH_3$ | $iso-C_3H_7$ | $iso-C_3H_7$ | 105–106 | 47.3(47.4) | 11.1(10.8) |
| B.31 | $C_2H_5$ | $CH_3$ | $iso-C_3H_7$ | 110–111 | 45.3(45.3) | 11.7(11.5) |
| B.32 | $C_2H_5$ | $C_2H_5$ | $iso-C_3H_7$ | 118–120 | 47.3(47.0) | 11.1(11.4) |
| B.33 | $C_2H_5$ | $n-C_3H_7$ | $iso-C_3H_7$ | 120–121 | 49.2(49.1) | 10.6(10.4) |
| B.34 | $C_2H_5$ | $iso-C_3H_7$ | $iso-C_3H_7$ | 111–113 | 49.2(49.3) | 10.6(10.3) |
| B.35 | $CH_3$ | $C_2H_5$ | $n-C_4H_9$ | 115–118 | 47.3(47.2) | 11–1(11.3) |
| B.36 | $CH_3$ | $iso-C_3H_7$ | $n-C_4H_9$ | 112–115 | 49.2(49.2) | 10.6(10.5) |
| B.37 | $C_2H_5$ | $CH_3$ | $n-C_4H_9$ | 125–127 | 47.3(47.0) | 11.1(11.3) |
| B.38 | $C_2H_5$ | $C_2H_5$ | $n-C_4H_9$ | 131–133 | 49.2(49.0) | 10.6(10.7) |
| B.39 | $C_2H_5$ | $iso-C_3H_7$ | $n-C_4H_9$ | 125–126 | 50.8(50.7) | 10.1 (9.8) |
| B.40 | $CH_3$ | $n-C_3H_7$ | $sec.-C_4H_9$ | 96–98 | 49.2(49.4) | 10.6(10.4) |
| B.41 | $CH_3$ | $iso-C_3H_7$ | $sec.-C_4H_9$ | 110–112 | 49.2(48.9) | 10.6(10.8) |
| B.42 | $CH_3$ | $C_2H_5$ | $tert.-C_4H_9$ | 101–102 | 47.3(47.5) | 11.1(10.7) |
| B.43 | $CH_3$ | $n-C_3H_7$ | $tert.-C_4H_9$ | 104 | 49.2(49.4) | 10.6(10.2) |
| B.44 | $C_2H_5$ | $CH_3$ | $tert.-C_4H_9$ | 104–105 | 47.3(47.2) | 11.1(11.0) |
| B.45 | $C_2H_5$ | $C_2H_5$ | $tert.-C_4H_9$ | 101 | 49.2(48.9) | 10.6(10.6) |
| B.46 | $iso-C_3H_7$ | $CH_3$ | $C_2H_5$ | 114–116 | 45.3(45.4) | 11.7(11.4) |
| B.47 | $iso-C_3H_7$ | $C_2H_5$ | $C_2H_5$ | 111 | 47.3(47.5) | 11.1(10.7) |
| B.48 | $n-C_3H_7$ | $CH_3$ | $C_2H_5$ | 113–115 | 45.3(45.6) | 11.7(11.5) |
| B.49 | $n-C_3H_7$ | $C_2H_5$ | $C_2H_5$ | 109–112 | 47.3(47.1) | 11.1(11.0) |
| B.50 | $n-C_3H_7$ | $n-C_3H_7$ | $C_2H_5$ | 123–125 | 49.2(49.3) | 10.6(10.2) |
| B.51 | $n-C_3H_7$ | $iso-C_3H_7$ | $C_2H_5$ | 100–103 | 49.2(49.0) | 10.6(10.5) |
| B.52 | $iso-C_3H_7$ | $n-C_3H_7$ | $C_2H_5$ | 115 | 49.2(49.1) | 10.6(10.3) |
| B.53 | $iso-C_3H_7$ | $iso-C_3H_7$ | $C_2H_5$ | 102 | 49.2(48.9) | 10.6(10.8) |

[1] M.P. ca. 40°.

Example C: Preparations containing any of the active agents shown in Table B (1) 50 parts by weight of each active agent and 50 parts by weight of isooctylphenyloctaglycol ether are mixed and in each case a clear solution results which can easily be stirred into water to form a finely dispersed emulsion.

(2) 20 parts by weight of each active agent are mixed with 30 parts by weight of isooctylphenyloctaglycol ether and 50 parts by weight of a petroleum fraction having a boiling range of 210–280° and a specific gravity at 20° of 0.92; in each case a clear solution results which has a good emulsifying power in water.

(3) 25 parts by weight of each active agent are mixed with 25 parts by weight of isooctylphenyldecaglycol ether and 50 parts by weight of xylene; in each case a clear solution results which has good emulsification power in water.

(4) By mixing 40 parts by weight of each active agent, 25 parts by weight of diisohexyl/heptylphenylhexaglycol ether and 35 parts by weight of acetone there is obtained in each case a clear solution which may be stirred easily into water to form a finely dispersed emulsion.

(5) 30 parts by weight of each active agent, 25 parts by weight of laurylhexaglycol ether and 45 parts by weight of isopropyl alcohol are stirred to form in each case a clear, homogeneous solution which may be easily emulsified in water.

Example D: Methods of using the preparations of Example C (I) Insecticidal contact effect.—Spraying agents containing 50% active agent according to Example C(1) are used. By emulsifying 4 g., 1 g. or 0.2 g. respectively thereof in 1 litre of water spraying liquors are produced containing respectively 0.2%, 0.05% or 0.01% of active agent.

(a) Contact effect of dry application on *Bruchidius obtectus*, imagines.—About 0.1–0.2 ml. of liquor per dish are sprayed with a spraying nozzle into a number of 7 cm. diameter Petri dishes. The liquor concentration is 0.05% and 0.01% respectively of active agent. After drying the covering for about 4 hours, 10 Bruchidius imagines are placed in each dish which is covered with a cover of fine mesh brass wire grating. The animals are kept without food at room temperature for 48 hours and then the dead ones are counted out. The mortality is stated as a percentage.

(b) Contact effect by direct spraying on Ephestia (Anagesta) Kuehniella, caterpillars.—On the eve of the treatment 10 caterpillars each of a length of 10–12 mm. are counted into a number of 7 cm. diameter petri dishes and the caterpillars are kept without food until treatment. On the day of treatment they are sprayed directly with a spraying nozzle in the open dish in such a way that the liquor amount per dish is 0.1–0.2 ml.; the liquor concentrations amount to 0.2 and 0.05% respectively of active agent. The dishes are covered with a lid of fine mesh brass wire grating. After drying the covering, a wafer is given as food and renewed as required. The dead animals are counted out after 5 days, the mortality being expressed as a percentage.

The results are shown in the following Table D I according to the scheme:

Br=Effect on Bruchidius after 2 days;
Ep=Effect on Ephestia after 5 days.

TABLE D I

| Example No. | Active agent No. | Insecticidal effect (percent mortality) | | | |
|---|---|---|---|---|---|
| | | Br | | Ep | |
| | | 0.05% | 0.01% | 0.2% | 0.05% |
| D.1 | B.2 | 100 | 100 | 100 | 100 |
| D.2 | B.3 | 100 | 100 | 100 | 100 |
| D.3 | B.5 | 100 | 100 | 100 | 100 |
| D.4 | B.6 | 100 | 100 | 100 | 100 |
| D.5 | B.8 | 100 | 100 | 100 | 100 |
| D.6 | B.10 | 100 | 100 | 100 | 100 |
| D.7 | B.4 | 100 | 60 | 100 | 100 |
| D.8 | B.17 | 100 | 100 | 100 | 90 |
| D.9 | B.12 | 100 | 100 | 100 | 100 |
| D.10 | B.19 | 100 | 70 | 100 | 100 |
| D.11 | B.46 | 100 | 100 | 100 | 90 |
| D.12 | B.47 | 100 | 100 | 100 | 80 |
| D.13 | B.51 | 100 | 100 | 100 | 100 |
| D.14 | B.23 | 100 | 100 | 100 | 90 |
| D.15 | B.24 | 100 | 100 | 100 | 80 |
| D.16 | B.25 | 100 | 100 | 100 | 100 |
| D.17 | B.28 | 100 | 100 | 100 | 100 |
| D.18 | B.27 | 100 | 100 | 100 | 100 |
| D.19 | B.30 | 100 | 100 | 100 | 100 |
| D.20 | B.36 | 100 | 100 | 100 | 90 |
| D.21 | B.41 | 100 | 100 | 100 | 00 |
| D.22 | B.29 | 100 | 100 | 100 | 90 |
| D.23 | B.31 | 100 | 100 | 100 | 100 |

For comparison purposes, using the same conditions as above and with the same test methods spraying agents are tested containing 50% of each of the two active agents.

B.54

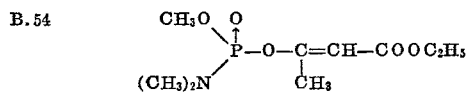

and

B.55

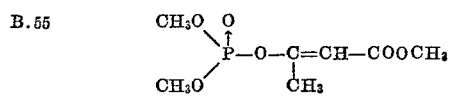

respectively.

The results are as follows:

| | Insecticidal effect (percent mortality) | | | |
|---|---|---|---|---|
| | Br | | Ep | |
| | 0.05% | 0.01% | 0.2% | 0.05% |
| B.54 | 0 | 0 | 60 | 10 |
| B.55 | 20 | 10 | 100 | 90 |

The dimethylamine derivative B.54 has an appreciably lesser insecticidal contact effect than the monoalkylamine derivatives of the present invention. Reference substance B.55 shows practically no effect on Bruchidius for which reason the outstanding insecticidal contact effect of the compounds of the Formula I is surprising and unexpected.

(II) Insecticidal feed effect on a dry covering of Tradeskantia leaves.—Spraying agent preparations containing 40% of active agent according to Example C(4) are used. By stirring 0.25 g. of each of these preparations in 1 litre of water liquors containing 0.01% of active agent are produced.

Insect: *Carausius morosus*

A cut off branch of Tradeskantia is immersed for 5 seconds in a moderately stirred liquor. The branch is then inserted into a small glass tube filled with water and this is placed into a glass dish having a diameter of 14 cm. 10 Carausius larvae II are counted into each dish which is then closed with a wire mesh lid and the dead animals are counted out after 5 days. The mortality is given in the following Table D II as a percentage.

TABLE D II

| Example No. | Active agent No. | Insecticidal effect Carausius |
|---|---|---|
| D.24 | B.1 | 100 |
| D.25 | B.4 | 100 |
| D.26 | B.6 | 100 |
| D.27 | B.10 | 90 |
| D.28 | B.17 | 90 |
| D.29 | B.5 | 90 |
| D.30 | B.35 | 100 |
| D.31 | B.54 | 20 |
| D.32 | B.55 | 0 |

The preparations of each of Examples D.31 and D.32 tested for comparison purposes are found to be practically without any effect.

(III) Acaricidal contact effect on *Tetranychus telarius*.—Spraying agent preparations each containing 25% active agent in accordance with Example C(3) are used. By stirring 2 g. and 0.4 g. respectively of each of said preparations into 1 litre of water liquors are produced containing 0.05 and 0.01% respectively of active agent.

One day before the treatment leaf disks of 2 cm. diameter are cut out with a cork borer from bean leaves; each leaf contains 20–30 mites (larvae III and adults). Up to the treatment the disks are kept in a petri dish on filter paper, they are then immersed in a moderately stirred liquor to effect treatment during 3 seconds and then replaced in the petri dish. Subsequently the filter paper is freshly moistened and the cover is applied at an oblique angle so that rapid drying on slight aeration is avoided. After 48 hours at room temperature the live and dead mites are counted out under a binocular magnifying glass (tenfold magnification). The mortality is stated in the following Table D III as a percentage.

TABLE D III

| Example No. | Active agent No. | Acaricidal effect | |
|---|---|---|---|
| | | 0.05% | 0.01% |
| D.33 | B.1 | 100 | 100 |
| D.34 | B.2 | 100 | 100 |
| D.35 | B.28 | 100 | 100 |
| D.36 | B.35 | 100 | 100 |
| D.37 | B.27 | 100 | 100 |
| D.38 | B.30 | 100 | 100 |
| D.39 | B.29 | 100 | 100 |
| D.40 | B.31 | 100 | 100 |
| D.41 | B.54 | 40 | 30 |
| D.42 | B.55 | 100 | 75 |

The preparation D.41 tested for comparison purposes is found to be practically ineffective. At high concentrations, the preparation D.42 tested for similar purposes has the same effect as the preparations of the invention. At low concentrations, however, preparation D.42 is clearly inferior to the preparations according to the invention.

Example E: Toxicity comparisons

| Active agent No. | Oral LD–50 on rats, mg./kg. |
|---|---|
| B.9 | 55 |
| B.11 | 12 |
| B.16 | 70 |
| B.17 | 30 |
| B.19 | 26 |
| B.18 | 75 |
| B.55 (known) | 3–5 |

As may be seen from the above table, the active agents of the Formula I surprisingly have a much lower toxicity towards warm-blooded animals than the known substance B.55. This means that the compounds of Formula I have an important advantage as regards their practical applicability in the protection of plants.

Although the present invention is described herein with particular reference to specific details, it is not intended that such details shall be regarded as limitations upon the scope of the invention except insofar as included in the accompanying claims.

We claim:
1. A compound of the Formula I

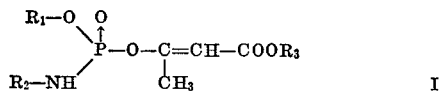

in which each of $R_1$, $R_2$ and $R_3$ represents an alkyl radical with from 1 to 5 carbon atoms inclusive.

2. A compound according to claim 1, in which each of $R_1$ and $R_3$ represents a methyl radical and $R_2$ represents an ethyl or n-propyl radical.

3. A compound according to claim 1, in which $R_1$ represents an ethyl radical, $R_3$ represents a methyl radical and $R_2$ represents a methyl, ethyl or iso-propyl radical.

4. A compound according to claim 1, in which $R_1$ represents a methyl radical, $R_2$ represents an iso-propyl radical, and $R_3$ represents an ethyl, iso-propyl or sec.-butyl radical.

5. The compound according to claim 1, in which $R_1$ represents an n-propyl radical, $R_2$ represents an iso-propyl radical and $R_3$ represents an ethyl radical.

6. The compound according to claim 1, in which each of $R_1$, $R_2$ and $R_3$ represents methyl.

7. The compound according to claim 1, in which $R_1$ represents ethyl and each of R and $R_3$ represents methyl.

8. The compound according to claim 1, in which each of $R_1$ and $R_2$ represents ethyl and $R_3$ represents methyl.

9. The compound according to claim 1, in which each of $R_1$ and $R_3$ represents methyl and $R_2$ represents ethyl.

10. The compound according to claim 1, in which $R_1$ represents methyl, $R_2$ represents n-propyl and $R_3$ represents ethyl.

11. The compound according to claim 1, in which $R_1$ represents methyl, $R_2$ represents n-propyl and $R_3$ represents iso-propyl.

References Cited

UNITED STATES PATENTS 3,053,729    9/1942    Sun _____ 260—941 UX

LEWIS GOTTS, Primary Examiner

A. H. SUTT, Assistant Examiner

U.S. Cl. X.R.

260—976; 424—212